(12) United States Patent
Kim

(10) Patent No.: US 11,192,457 B2
(45) Date of Patent: Dec. 7, 2021

(54) CHARGING CONTROL DEVICE FOR CHARGING ELECTRIC VEHICLE

(71) Applicant: LG INNOTEK CO., LTD., Seoul (KR)

(72) Inventor: Hyoung Dong Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 160 days.

(21) Appl. No.: 16/482,510

(22) PCT Filed: Feb. 7, 2018

(86) PCT No.: PCT/KR2018/001650
§ 371 (c)(1),
(2) Date: Jul. 31, 2019

(87) PCT Pub. No.: WO2018/147635
PCT Pub. Date: Aug. 16, 2018

(65) Prior Publication Data
US 2020/0009981 A1 Jan. 9, 2020

(30) Foreign Application Priority Data

Feb. 8, 2017 (KR) .................. 10-2017-0017434

(51) Int. Cl.
*B60L 50/60* (2019.01)
*B60L 53/66* (2019.01)

(52) U.S. Cl.
CPC ............... *B60L 50/60* (2019.02); *B60L 53/66* (2019.02)

(58) Field of Classification Search
CPC .................................. B60L 50/60; B60L 53/66
(Continued)

(56) References Cited

U.S. PATENT DOCUMENTS

| 10,259,315 B2* | 4/2019 | Jobst .................... H01R 13/447 |
| 2014/0285209 A1* | 9/2014 | Stichowski ........... B60L 3/0069 324/503 |

(Continued)

FOREIGN PATENT DOCUMENTS

| EP | 2663467 A1 | 11/2013 |
| FR | 2996376 A1 | 4/2014 |

(Continued)

OTHER PUBLICATIONS

Supplementary European Search Report dated Dec. 8, 2020 in European Application No. 18751538.2.

(Continued)

*Primary Examiner* — Suchin Parihar
(74) *Attorney, Agent, or Firm* — Saliwanchik, Lloyd & Eisenschenk

(57) ABSTRACT

A charging control device for charging an electric vehicle according to one embodiment of the present invention comprises: a first switch unit for receiving a first control signal from the outside; a first control unit for receiving the first control signal through the first switch unit; a second switch unit for receiving a second control signal from the outside; a second control unit which is woken up by the first control unit and receives the second control signal through the second switch unit; and a motor control unit which is controlled by the second control unit and controls driving of a motor for a charging flap, wherein the second control unit disables the first switch and enables the second switch when the second control unit is woken up by the first control unit.

17 Claims, 8 Drawing Sheets

(58) Field of Classification Search
USPC .......................................................... 320/109
See application file for complete search history.

(56) References Cited

U.S. PATENT DOCUMENTS

| | | | |
|---|---|---|---|
| 2016/0001719 A1* | 1/2016 | Frost | B60L 3/0046 |
| | | | 307/10.1 |
| 2016/0129800 A1* | 5/2016 | Mauter | B60L 53/62 |
| | | | 320/109 |
| 2017/0057346 A1* | 3/2017 | Herzig | B60K 15/05 |
| 2018/0315302 A1* | 11/2018 | Niemann | H04W 4/44 |
| 2020/0189413 A1* | 6/2020 | Fagan | B60L 53/37 |
| 2020/0276908 A1* | 9/2020 | Lim | G01R 19/16528 |
| 2020/0298717 A1* | 9/2020 | Herold | B60L 53/16 |
| 2021/0213828 A1* | 7/2021 | Daiminger | B60K 15/05 |

FOREIGN PATENT DOCUMENTS

| | | |
|---|---|---|
| JP | 2011-087408 A | 4/2011 |
| JP | 2012-205314 A | 10/2012 |
| JP | 5168430 B1 | 3/2013 |
| JP | 5908675 B2 | 4/2016 |
| KR | 10-2012-0133481 A | 12/2012 |
| KR | 10-2016-0119167 A | 10/2016 |
| KR | 10-2017-0006697 A | 1/2017 |
| WO | WO-2016/082326 A1 | 6/2016 |

OTHER PUBLICATIONS

International Search Report dated May 21, 2018 in International Application No. PCT/KR2018/001650.

* cited by examiner

[FIG. 1]
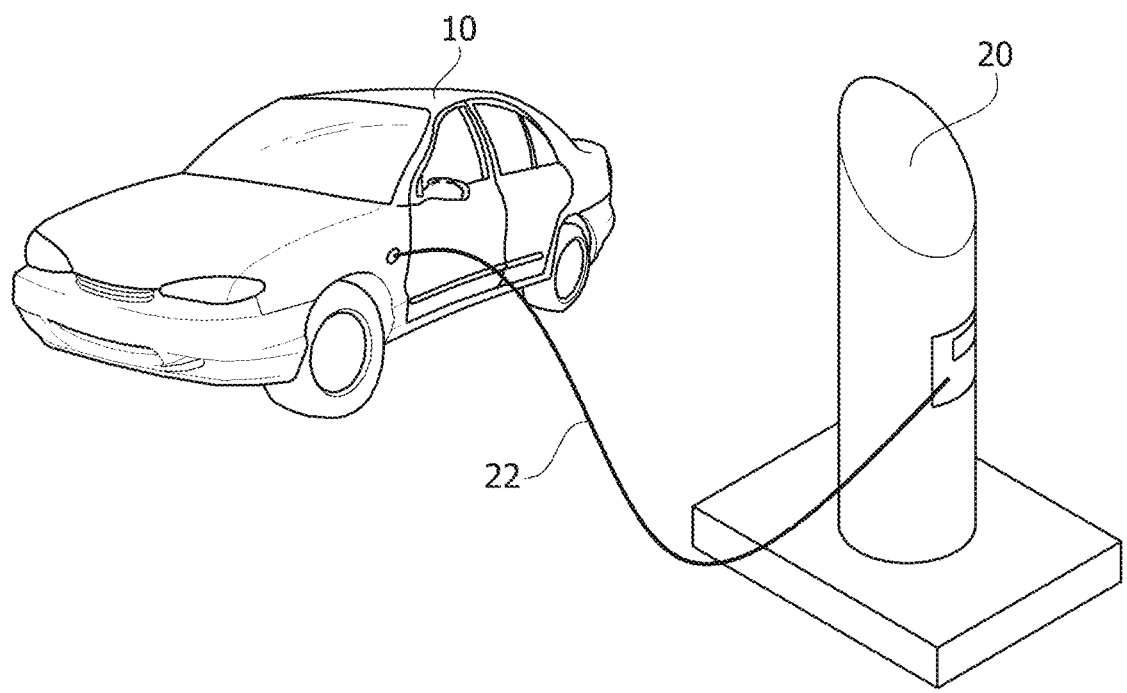

[FIG. 2]
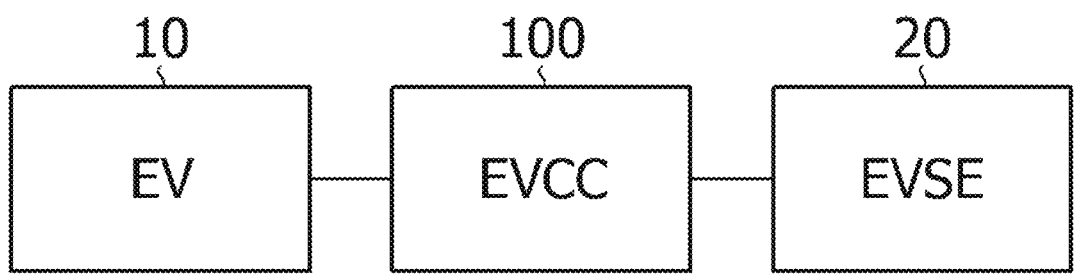

[FIG. 3]
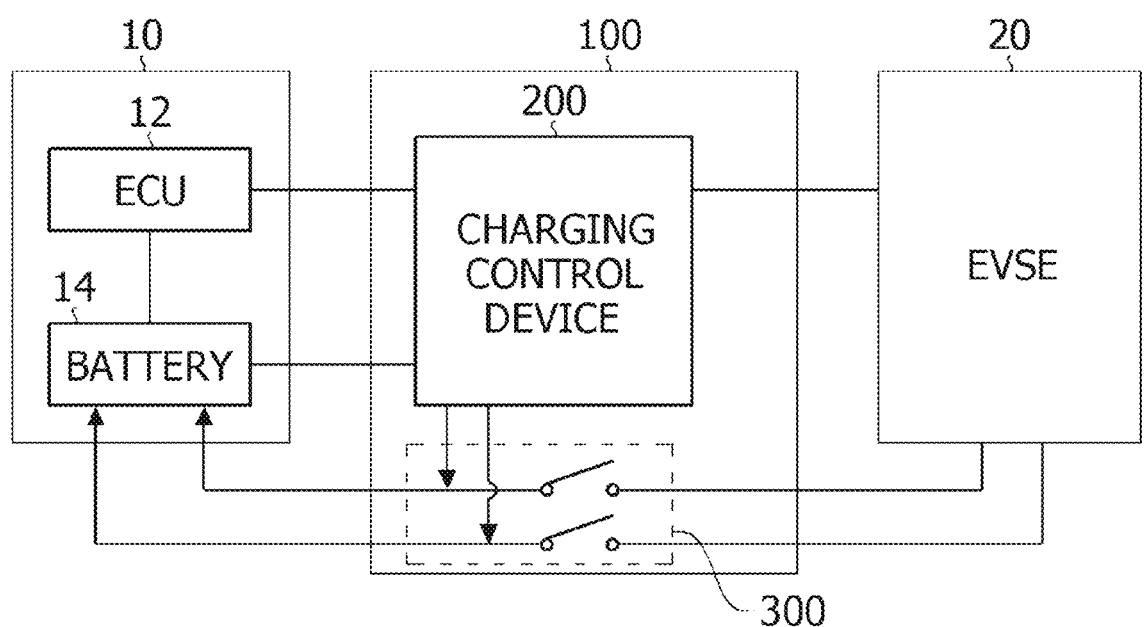

[FIG. 4]
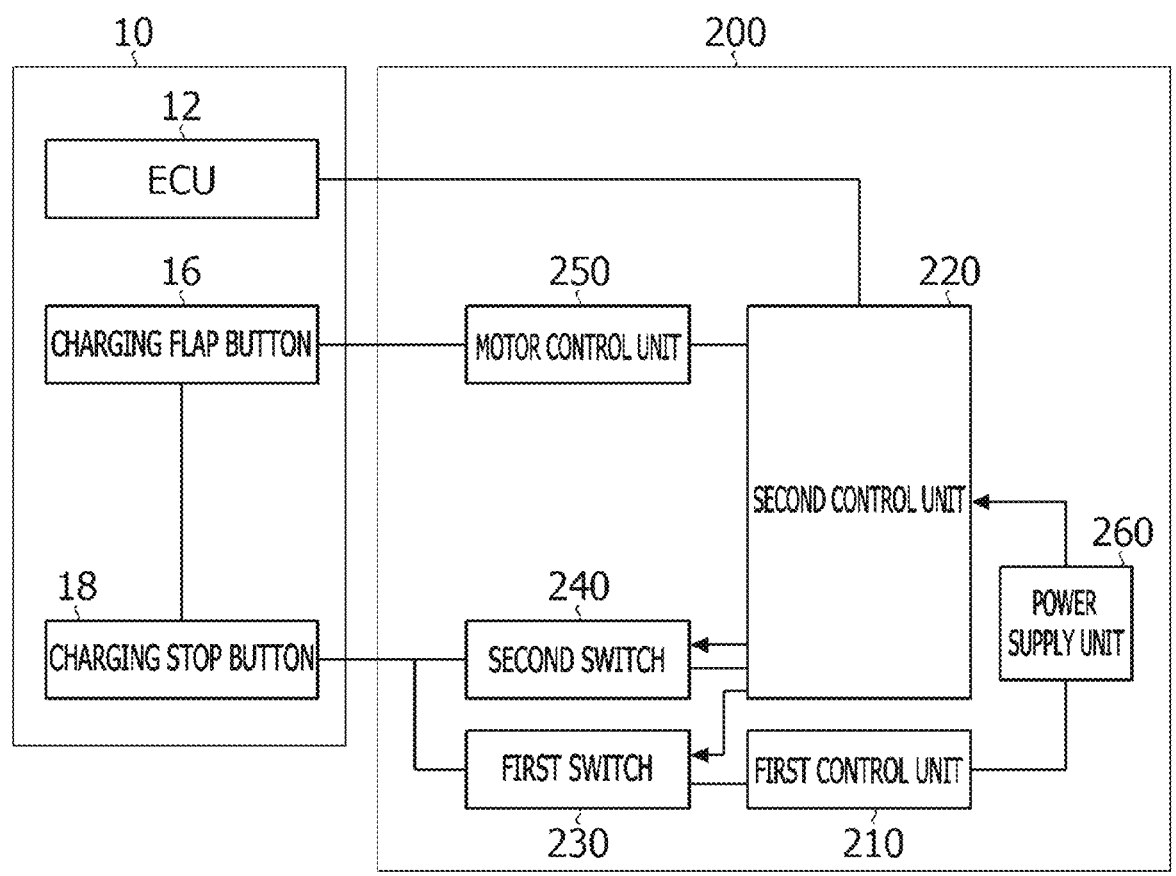

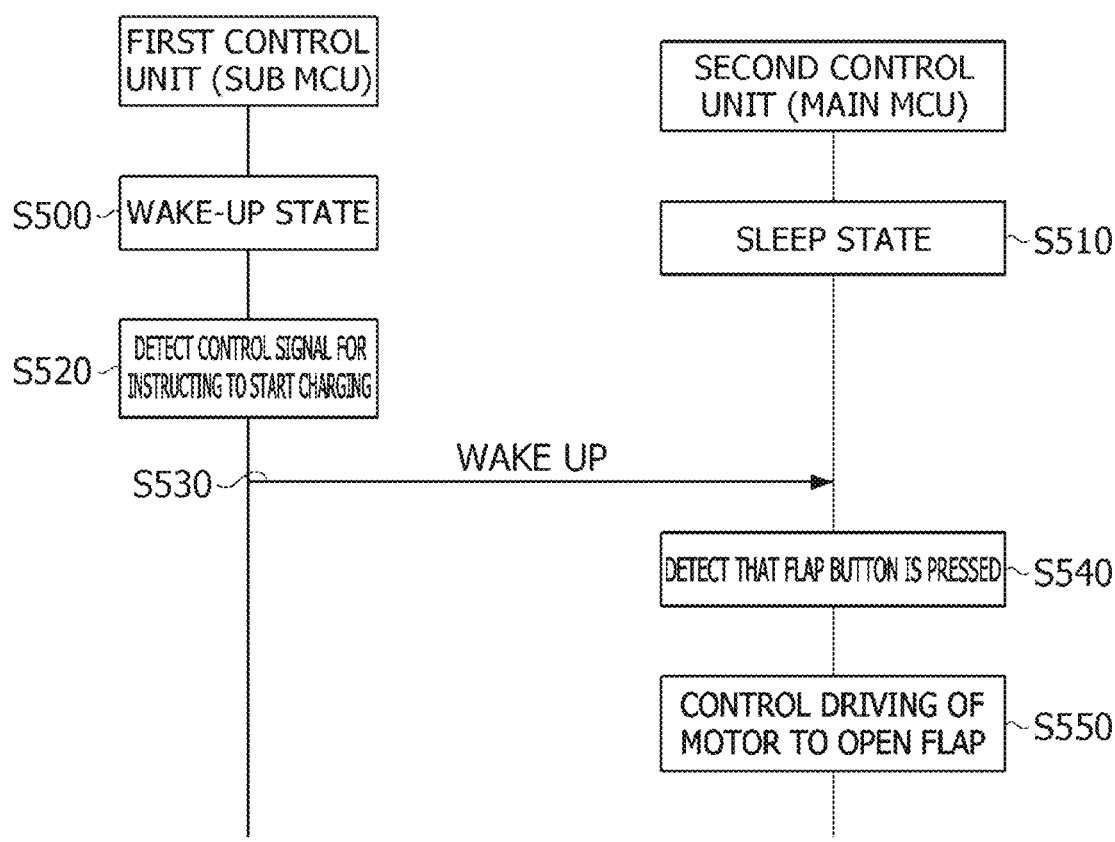
[FIG. 5]

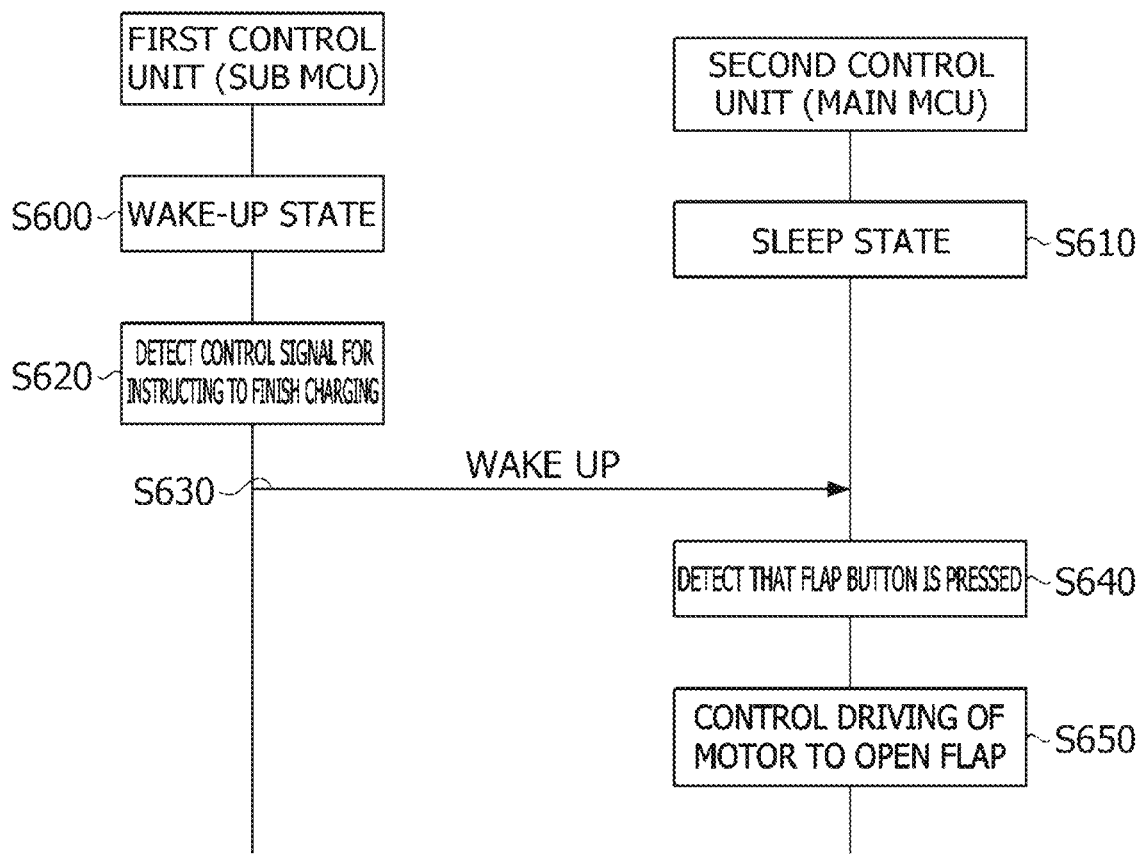
[FIG. 6]

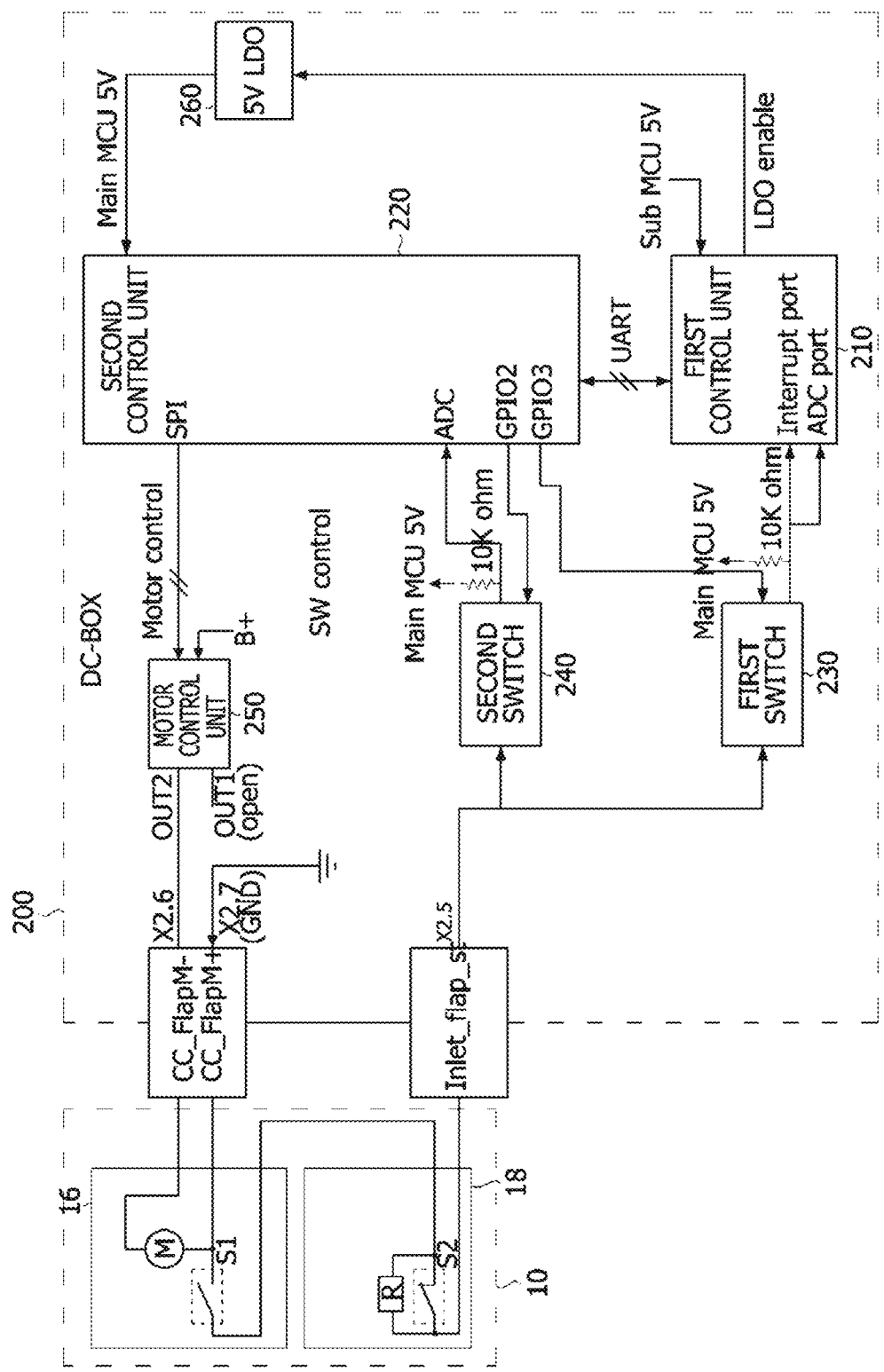
[FIG. 7]

[FIG. 8]
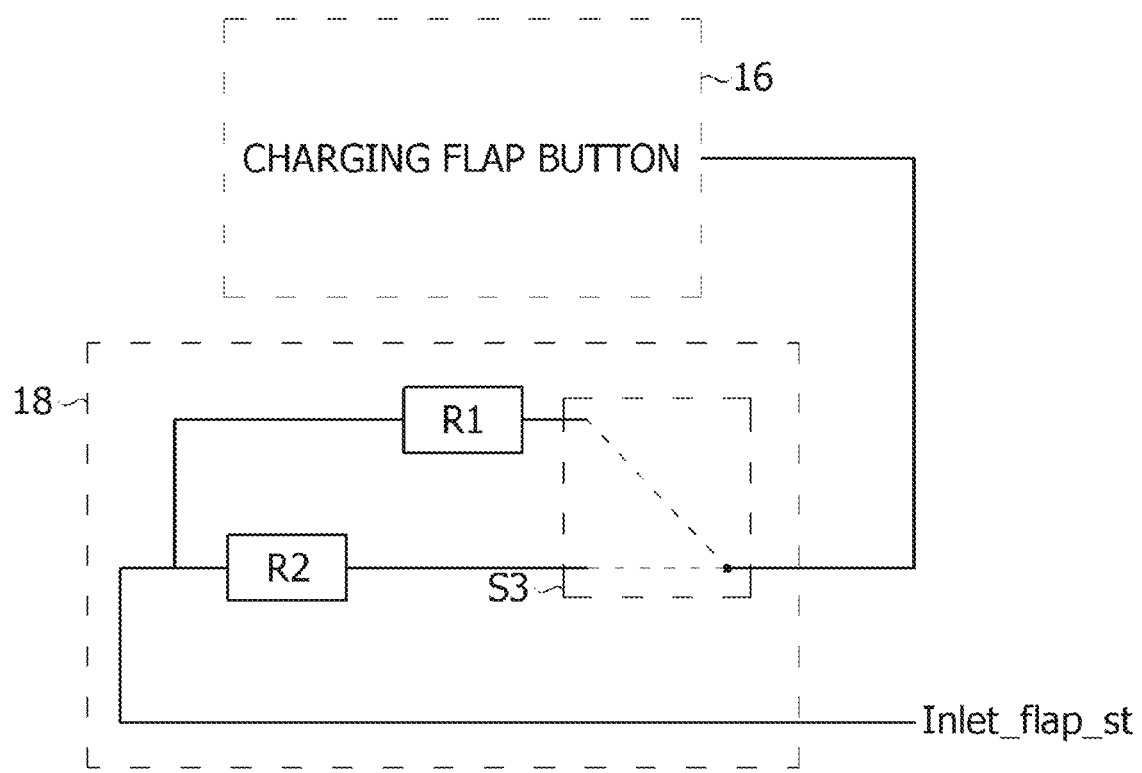

CHARGING CONTROL DEVICE FOR CHARGING ELECTRIC VEHICLE

CROSS-REFERENCE TO RELATED APPLICATIONS

This application is the U.S. national stage application of International Patent Application No. PCT/KR2018/001650, filed Feb. 7, 2018, which claims the benefit under 35 U.S.C. § 119 of Korean Patent Application No. 10-2017-0017434, filed Feb. 8, 2017, which are hereby incorporated by reference in their entirety.

TECHNICAL FIELD

The present invention relates to an electric vehicle, and more specifically, to charging of an electric vehicle.

BACKGROUND ART

Eco-friendly vehicles, such as electric vehicles (EVs) or plug-in hybrid electric vehicles (PHEVs), use electric vehicle supply equipment (EVSE) installed at supplies to charge batteries.

To this end, an electric vehicle charging controller (EVCC) is installed in the EV and communicates with the EV and the EVSE to control charging of the EV.

For example, when the EVCC receives a signal for instructing to start charging from the EV, the EVCC may control so as to start charging, and when the EVCC receives a signal for instructing to finish charging from the EV, the EVCC may control so as to finish the charging.

Here, the EV may be charged through a slow charging method or fast charging method. When slow charging is performed, a charging time period of about seven hours is needed, and when fast charging is performed, a charging time period of about thirty minutes is needed. Accordingly, in a case in which a user is not present at a time point at which the slow charging or fast charging is finished, since a process for finishing the charging cannot proceed normally, a state in which the EV is connected to a charging control device is maintained, and thus there is a problem in that a current is unnecessarily wasted.

DISCLOSURE

Technical Problem

The present invention is directed to providing a charging control device for charging an electric vehicle.

Technical Solution

One aspect of the present invention provides a charging control device of an electric vehicle, which includes: a charging flap switch; a charging stop switch; a main controller which operates in a sleep mode or a wake-up mode, and controls charging of a battery of the electric vehicle; load switches which detect an on-state or off-state of the charging flap switch and an on-state or off-state of the charging stop switch; a power supply unit which supplies power to the main controller; and an auxiliary controller which enables or disables the power supply unit, wherein, in a case in which the main controller operates in the sleep mode, when the auxiliary controller detects the on-state of the charging flap switch and the on-state of the charging stop switch or detects the on-state of the charging flap switch and the off-state of the charging stop switch, the auxiliary controller enables the power supply unit to operate the main controller in a wake-up mode.

When the main controller detects the on-state of the charging flap switch and the off-state of the charging stop switch, the main controller may transmit a signal for turning on a main power supply of the electric vehicle to the outside.

The charging flap switch may be connected to a charging flap and a motor which opens or closes the charging flap.

When the main controller detects the on-state of the charging flap switch, the main controller may generate a control signal such that the motor opens the charging flap.

In a case in which the main controller is in the wake-up mode, the auxiliary controller may maintain an enabled state of the power supply unit.

The charging stop switch may be connected to the charging flap switch and the load switches in series, and connected to a resistor having a preset value in parallel.

The load switches may include a first load switch and a second load switch, wherein the first load switch may be disabled when the second load switch is enabled, the second load switch may be disabled when the first load switch is enabled, the first load switch may be connected to the main controller, and the second load switch may be connected to the auxiliary controller.

Another aspect of the present invention provides a charging control device for charging an electric vehicle, which includes a first switch unit which receives a first control signal from the outside, a first control unit which receives the first control signal through the first switch unit, a second switch unit which receives a second control signal from the outside, a second control unit which is woken up by the first control unit and receives the second control signal through the second switch unit, and a motor control unit which is controlled by the second control unit and controls driving of a motor for a charging flap, wherein, when the second control unit is woken up by the first control unit, the second control unit disables the first switch and enables the second switch.

The first control signal may be a control signal for instructing to start charging or a control signal for instructing to finish charging.

When the first control signal is the control signal for instructing to start charging, the first control signal may have a falling edge which falls from a first voltage value to a second voltage value.

When the first control unit recognizes the falling edge, the first control unit may wake up the second control unit in a sleep state.

When the first control signal is the control signal for instructing to finish charging, the first control signal may have a rising edge which rises from a third voltage value to a fourth voltage value.

When the first control unit recognizes the rising edge, the first control unit may wake up the second control unit in the sleep state.

The first control signal and the second control signal may be control signals output through one line.

The first control signal and the second control signal may be set so as to be output through a charging stop button of the electric vehicle, and the charging stop button of the electric vehicle may be set so as to be connected to a charging flap button of the electric vehicle.

Still another aspect of the present invention provides a charging control method of a charging control device for charging an electric vehicle, which includes receiving, by a first switch unit, a first control signal, which is a control signal for instructing to start charging or a control signal for instructing to finish charging, from an electric vehicle; detecting, by an auxiliary controller in a wake-up state, the first control signal input through the first switch unit; enabling, by the auxiliary controller, a power supply unit which supplies power to a main controller to wake up the main controller that is in a sleep state; disabling, by the main controller, the first switch unit and enabling a second switch unit; and controlling, by the main controller, charging of the electric vehicle when the main controller detects a second control signal input through the second switch unit, wherein the control signal for instructing to start charging is a signal which indicates that an on-state of a charging flap switch and an on-state of a charging stop switch are detected, and the control signal for instructing to finish charging is a signal which indicates that the on-state of the charging flap switch and an off-state of the charging stop switch are detected.

The charging control method may further include transmitting, by the main controller, a signal for turning on a main power supply of the electric vehicle to the outside in a case in which the first control signal is the control signal for instructing to finish charging.

The charging control method may further include generating, by the main controller, a control signal for causing a motor, which opens or closes a charging flap, to open the charging flap in a case in which the first control signal is the control signal for instructing to start charging.

In a case in which the main controller is woken up, the power supply unit may maintain an enabled state.

The first switch unit may be disabled when the second switch unit is enabled, and the second switch unit may be disabled when the first switch unit is enabled.

The control signal for instructing to start charging may be a signal having a falling edge, and the control signal for instructing to finish charging may be a signal having a rising edge.

Advantageous Effects

According to an embodiment, since a control signal for instructing to start charging and a control signal for instructing to finish charging can be monitored through one line, a structure of a charging control device can be simplified, a structure of an electric vehicle can also be simplified, and thus manufacturing costs can be reduced.

The charging control device does not unnecessarily consume a current while the electric vehicle is charged or is not charged. In particular, even in a case in which a control signal for instructing to finish charging cannot be transmitted normally to the charging control device because a user is not present at a time point at which charging should be finished, unnecessary consumption of current due to operation of a microcontroller unit (MCU) of the charging control device can be inhibited.

DESCRIPTION OF DRAWINGS

FIGS. 1 to 3 are views illustrating a charging system of an electric vehicle according to one embodiment of the present invention.

FIG. 4 is a block diagram illustrating a charging control device according to one embodiment of the present invention.

FIG. 5 is one example of an operational scenario of the charging control device according to one embodiment of the present invention.

FIG. 6 is another example of an operational scenario of the charging control device according to one embodiment of the present invention.

FIG. 7 is a view for describing a process in which the charging control device operates according to one embodiment of the present invention.

FIG. 8 is a view illustrating a structure of a charging stop button according to another embodiment of the present invention.

MODES OF THE INVENTION

As the present invention allows for various changes and numerous embodiments, specific embodiments will be illustrated in the drawings and described in detail in the written description. However, this is not intended to limit the present invention to specific embodiments, and it is to be appreciated that all changes, equivalents, and substitutes that do not depart from the spirit and technical scope of the present invention are encompassed in the present invention.

It will be understood that, although the terms "first," "second," etc. may be used herein to describe various elements, these elements should not be limited by these terms. These terms are only used to distinguish one element from another. For example, a first element could be termed a second element, and a second element could similarly be termed a first element without departing from the scope of the present invention. As used herein, the term "and/or" includes combinations or any one of a plurality of associated listed items.

It will be understood that when an element is referred to as being "connected" or "coupled" to another element, it can be directly connected or coupled to another element or intervening elements may be present. In contrast, when an element is referred to as being "directly connected" or "directly coupled" to another element, there are no intervening elements.

The terminology used herein to describe the embodiments of the present invention is not intended to limit the scope of the present invention. The articles "a," and "an" are singular in that they have a single referent, however, the use of the singular form in the present document should not preclude the presence of more than one referent. In other words, elements of the present invention referred to in the singular may number one or more, unless the context clearly indicates otherwise. It will be further understood that the terms "comprise," "comprising," "include," and/or "including," when used herein, specify the presence of stated features, numbers, steps, operations, elements, components, and/or combinations thereof, but do not preclude the presence or addition of one or more other features, numbers, steps, operations, elements, components, and/or combinations thereof.

Unless otherwise defined, all terms (including technical and scientific terms) used herein are to be interpreted as is customary in the art to which this invention belongs. It should be further understood that terms in common usage should also be interpreted as is customary in the relevant art and not in an idealized or overly formal sense unless expressly so defined herein.

Embodiments of the invention will be described below in more detail with reference to the accompanying drawings. Components that are the same or are corresponding to each other are denoted by the same reference numeral regardless of the figure number, and redundant description will be omitted.

FIGS. 1 to 3 are views illustrating a charging system of an electric vehicle (EV) according to one embodiment of the present invention.

Referring to FIGS. 1 to 3, an EV 10 may be charged by electric vehicle supply equipment (EVSE) 20. To this end, a charging cable 22 connected to the EVSE 20 may be connected to an inlet of the EV 10. Here, the EVSE 20 is an apparatus which supplies an alternating current (AC) or direct current (DC), and may be disposed at a supply or home, or may also be portably implemented. The EVSE 20 may also be referred to as a supply, an AC supply, a DC supply, a socket-outlet, or the like.

An electric vehicle charging controller (EVCC) 100 is installed in and connected to the EV 10. For example, the EVCC 100 may be installed in a trunk of the EV 10, but is not limited thereto.

Here, the EVCC 100 may communicate with the EV 10 and the EVSE 20.

According to the embodiment of the present invention, the EVCC 100 includes a charging control device 200 and a power supply unit 300.

The charging control device 200 is connected to the EV 10 and the EVSE 20. The charging control device 200 may be connected to the EV 10 and the EVSE 20 through a plurality of pins.

For example, the charging control device 200 may include 20 pins connected to the EVSE 20 and communicates with the EVSE 20 through the 20 pins. For example, among the 20 pins, one pin may be a pin for a control pilot (CP) port for receiving a CP signal from the EVSE 20, another pin may be a pin for a proximity detection (PD) port for detecting whether a charging cable connector is close, and another pin may be a pin for a protective earth (PE) port connected to a ground of the EVSE 20. Another pin among the 20 pins may be a pin for driving a motor to open a flap of an inlet, another pin may be a pin for sensing a motor, and another pin may be a pin for sensing a temperature. Another pin may be a pin for sensing a light-emitting diode (LED), and another pin may be a pin for controller area network (CAN) communication. However, the number of pins and functions of the pins are not limited thereto and may be variously changed.

In addition, the charging control device 200 may include 12 pins connected to the EV 10 and may communicate with the EV 10 through the 12 pins. For example, among the 12 pins, one pin may be a pin for a voltage line applied from a collision detection sensor in the EV 10, another pin may be a battery pin in the EV 10, another pin may be a pin for CAN communication, another pin may be a pin connected to a ground, and another pin may be a pin for high voltage protection. However, the number of pins and functions of the pins are not limited thereto and may be variously changed.

Power is supplied to a battery 14 of the EV 10 by the power supply unit 300 of the EVCC 100 through two high voltage lines of the EVSE 20, and turn-on and turn-off of the high voltage lines may be controlled by the charging control device 200.

That is, the charging control device 200 may communicate with an electronic control unit (ECU) 12 of the EV 10, and control the power supply unit 300 which transmits power supplied from the EVSE 20 to the battery 12 of the EV 10 according to respective signals received from the EV 10 and the EVSE 20.

FIG. 4 is a block diagram illustrating the charging control device according to one embodiment of the present invention.

Referring to FIG. 4, the charging control device 200 includes a first control unit 210 and a second control unit 220. In the present specification, the first control unit 210 may also be referred to as a sub microcontroller (MCU), an auxiliary control unit, an auxiliary controller, or the like, and the second control unit 220 may also be referred to as a main MCU, a main control unit, and a main controller. Here, the MCU may be a computer in which a microprocessor and input and output modules are integrated in one chip to perform a predetermined function. In a case in which the MCU is installed in a vehicle, the MCU may be implemented as a device such as an electronic control unit (ECU), and an automobile engine, an automatic transmission, and various parts of an anti-lock braking system (ABS) are controlled by a computer. The MCU according to the embodiment of the present invention may be applied in the charging control device 200 to charge the EV and divided into a sub MCU and a main MCU.

According to the embodiment of the present invention, the sub MCU which is the first control unit 210 may be a unit which is separately formed from the main MCU which is the second control unit 220. Generally, since the MCUs applied in the charging control device 200 generally control the charging of the EV, power consumption may be large. Since the MCUs use a battery voltage of the EV, power consumption of the MCUs may be a big issue. According to the embodiment of the present invention, the MCUs may be divided into the sub MCU which is the first control unit 210 and the main MCU which is the second control unit 220, the second control unit 220 may be operated in a sleep mode or wake-up mode and may generally perform an operation for controlling charging of the EV, and unnecessary current consumption may be inhibited in a sleep state in which charging is not performed. In addition, the first control unit 210 which consumes a relatively small current is in a wake-up state normally, and when an issue occurs, for example, in a case in which a control signal for instructing to start charging is received or a control signal for instructing to finish charging, the first control unit 210 may serve to wake up the second control unit 220.

To this end, the charging control device 200 may further include a first switch unit 230 which receives a first control signal from the outside and is connected to the first control unit 210 and a second switch unit 240 which receives a second control signal from the outside and is connected to the second control unit 220. The first switch unit 230 may be disabled when the second switch unit 240 is enabled, and the second switch unit 240 may be disabled when the first switch unit 230 is disabled.

Here, the first control signal input to the first switch unit 230 and the second control signal input to the second switch unit 240 may be control signals output through one line. The first control signal and the second control signal may be signals for indicating an on-state or off-state of a charging flap button 16 and a charging stop button 18. In the present specification, the charging flap button 16 may also be referred to as a charging flap button, and the charging stop button 18 may also be referred to as a charging stop button. In addition, the first switch unit 230 and the second switch unit 240 may also be referred to as load switches.

In a case in which the second control unit 220 is in a sleep state, the first control unit 210 may monitor the first switch unit 230, and when the first control unit 210 receives the first control signal through the first switch unit 230, the first control unit 210 may enable a power supply unit 260 which supplies power to the second control unit 220 to wake up the second control unit 220. To this end, the power supply unit 260 may be disposed between the first control unit 210 and the second control unit 220 and enabled or disabled by the first control unit 210.

When the second control unit 220 in the sleep state is woken up by the first control unit 210, the second control unit 220 may disable the first switch unit 230 and enable the second switch unit 240. Accordingly, the second control unit 220 may monitor the second switch unit 240 and receive the second control signal through the second switch unit 240.

Here, the first control signal may be a control signal for instructing to start charging or a control signal for instructing to finish charging, and the first control signal may be a signal output from the outside of the charging control device 200, that is, from the EV 10.

For example, the EV 10 may include the charging flap button 16 and the charging stop button 18, the charging flap button 16 and the charging stop button 18 may be connected to each other, and the charging stop button 18 may be connected to the first switch unit 230 and the second switch unit 240.

In a case in which a user wants to open the inlet to start charging of the EV 10, the user may press the charging flap button 16. When the charging flap button 16 is pressed, the first control signal may be input to the first switch unit 230 through the charging stop button 18.

In a case in which the first control signal is a control signal for instructing to start charging, the second control unit 220 woken up by the first control unit 210 disables the first switch unit 230, enables the second switch unit 240, monitors the second control signal input through the second switch unit 240, and controls a motor control unit 250 at the same time. The motor control unit 250 may control driving of a motor to open a charging flap, that is, the inlet. Accordingly, the inlet may be opened, and a charging process of the EV 10 may be performed.

Meanwhile, in a case in which a user is not present when charging is finished, the user cannot immediately press the charging stop button 18. When a predetermined time period has passed in a state in which the user does not take any action after the charging is finished, the second control unit 220 reenters a sleep state. Here, each of the charging control device 200 and the ECU 12 of the EV 10 may enter a sleep state. In the case in which the second control unit 220 enters the sleep state, the first control unit 210 monitors the first control signal input through the first switch unit 230 in a wake-up state.

Then, when the user presses the charging stop button 18, a control signal for instructing to finish charging is input to the first control unit 210 through the first switch unit 230, and accordingly, the first control unit 210 wakes up the second control unit 220. The second control unit 220 woken up by the first control unit 210 disables the first switch unit 230, enables the second switch unit 240, monitors the second control signal input through the second switch unit 240, and wakes up the ECU 12 of the EV 10 at the same time.

FIG. 5 is one example of an operational scenario of the charging control device according to one embodiment of the present invention, and FIG. 6 is another example of an operational scenario of the charging control device according to one embodiment of the present invention.

Referring to FIG. 5, in a state in which charging of the EV 10 is not started, the first control unit 210 which is the sub MCU is in a wake-up state (S500), and the second control unit 220 which is the main MCU is in a sleep state (S510). Accordingly, the main MCU can inhibit unnecessary power consumption.

When the user presses the charging flap button 16 of the EV 10 to start charging, the first control unit 210 detects a control signal for instructing to start charging (S520). Here, the control signal for instructing to start charging may be a control signal having a falling edge.

When the first control unit 210 detects the control signal for instructing to start charging, the first control unit 210 wakes up the second control unit 220 (S530).

Accordingly, the woken up second control unit 220 detects that the charging flap button 16 is pressed (S540), and controls driving of the motor to open the inlet (S550).

Meanwhile, referring to FIG. 6, in a case in which the user does not perform an operation to finish charging for a predetermined time period in a state in which charging of the EV 10 is finished, the first control unit 210 which is the sub MCU is in a wake-up state (S600), and the second control unit 220 which is the main MCU enters a sleep state (S610). Accordingly, power consumption of the main MCU can be inhibited.

When the user presses the charging stop button 18 of the EV 10 to finish the charging, the first control unit 210 detects a control signal for instructing to finish charging (S620). Here, the control signal for instructing to finish charging may be a control signal having a rising edge.

When the first control unit 210 detects the control signal for instructing to finish charging, the first control unit 210 wakes up the second control unit 220 (S630).

Accordingly, the woken-up second control unit 220 detects that the charging stop button 18 is pressed (S640), and wakes up the ECU 12 of the EV 10 (S640).

Hereinafter, a process in which the charging control device according to the embodiment of the present invention performs an operation according to a control signal to start charging and a control signal to finish charging will be described in more detail.

FIG. 7 is a view for describing a process in which the charging control device operates according to one embodiment of the present invention.

Referring to FIG. 7, the EV 10 includes the charging flap button 16 and the charging stop button 18, and the charging control device 200 includes the first control unit 210, the second control unit 220, the first switch unit 230, the second switch unit 240, and the motor control unit 250.

The charging flap button 16 is connected to the inlet and a motor M to open the inlet, the motor M is connected to the charging control device 200 through two pins CC_FlapM− and CC_FlapM+, the charging control device 200 outputs signals for controlling driving of the motor M to open the inlet through the two pins CC_FlapM− and CC_FlapM+. In the present specification, the inlet may also be referred to as a charging flap or a flap.

The charging stop button 18 is connected to the charging control device 200 through one pin Inlet_flap_st, and the charging stop button 18 outputs a control signal for instructing to start charging or a control signal for instructing to finish charging to the charging control device 200 through the one pin Inlet_flap_st.

In the present specification, a switch S1 of the charging flap button 16 may also be referred to as a charging flap switch or the like, and a switch S2 of the charging stop button 18 may also be referred to as a charging stop switch or the like.

Normally, that is, in a state in which charging is not performed, the switch S1 of the charging flap button 16 is opened, and the switch S2 of the charging stop button 18 is closed. At this time, the charging flap button 16 and the charging stop button 18 are disconnected, and accordingly, the first switch unit 230 may be set such that a predetermined voltage value, for example 5 V, is input to the first switch unit 230. Here, the second control unit 220 is in a sleep state, and the first control unit 210 continuously monitors the first switch unit 230 in a wake-up state.

In a case in which the user wants to open the inlet to start charging, the user presses the charging flap button 16. Accordingly, the switch S1 of the charging flap button 16 is closed, and the charging flap button 16 is connected to the charging stop button 18. Since the switch S2 of the charging stop button 18 is still closed, and the charging stop button 18 is connected to a ground through the charging flap button 16, a voltage of 0 V may be input to the first switch unit 230 from the charging stop button 18.

The first switch unit 230 may be a low active load switch, and accordingly, in a case in which a value of the voltage input to the first switch unit 230 is lowered from 5V to 0 V, that is, the first control signal input to the first switch unit 230 has a falling edge, the first control unit 210 may wake up the second control unit 220. That is, in a case in which both of the switch S1 of the charging flap button 16 and the switch S2 of the charging stop button 18 are detected as being in on-states, the first control unit 210 may enable the power supply unit 260 such that the second control unit 220 is operated in a wake-up mode.

To this end, the first control unit 210 may include an interrupt port I_P and an analog-to-digital conversion (ADC) port ADC_P and monitor control signals applied through the interrupt port I_P and the ADC port ADC_P. The interrupt port I_P may be a port which wakes up at a predetermined cycle and may monitor whether there are a change in a voltage value, a rising edge, and a falling edge of a signal applied to the first control unit 210. The ADC port ADC_P may be a port which continuously wakes up and may monitor the voltage value of the signal applied to the first control unit 210.

When the first control unit 210 detects the falling edge using the interrupt port I_P or ADC port ADC_P, the first control unit 210 enables a power supply (5V low dropout (LDO)) which supplies power to the second control unit 220 to wake up the second control unit 220.

When the second control unit 220 wakes up, the second control unit 220 may disable the first switch unit 230 and enable the second switch unit 240. To this end, the second control unit 220 may disable the first switch unit 230 using a general-purpose input/output 3 (GPIO3) port and enable the second switch unit 240 using a general-purpose input/output 2 (GPIO2) port.

Accordingly, the second control signal is applied from the charging stop button 18 through the second switch unit 240, and the second control unit 220 monitors the second control signal using the ADC port. In a case in which the second control signal is a control signal which instructs to start charging, that is, the charging flap button 16 is pressed, the second control unit 220 may control a motor integrated circuit (IC) block which is the motor control unit 250, and accordingly, the motor control unit 250 may output a control signal to drive a motor to open the inlet.

Here, in a case in which the second control unit 220 is in a wake-up mode, the first control unit 210 may maintain an enabled state of the power supply unit 260.

Then, in a case in which a user does not take a predetermined action for a predetermined time period after the charging is finished, that is, the user does not press the charging stop button 18 for the predetermined time period after the charging is finished, the second control unit 220 may enable the first switch unit 230, disable the second switch unit 240, and enter a sleep state after informing that the second control unit 220 will enter the sleep state to the first control unit 210. In addition, the ECU 12 of the EV 10 may also enter a sleep state.

In addition, the first control unit 210 monitors the first control signal applied through the first switch unit 230. Here, since both of the switch S1 of the charging flap button 16 and the switch S2 of the charging stop button 18 are still in closed states, the first control signal continuously has a voltage of 0 V.

In a case in which the user returns and immediately presses the charging stop button 18, the switch S2 of the charging stop button 18 is opened in a state in which the switch S1 of the charging flap button 16 is closed. The first control signal may have a voltage greater than 0 V and less than 5 V, for example 3.5 V, due to a resistor R of the charging stop button 18.

In a case in which a voltage input to the first switch unit 230 has risen to 3.5 V from 0 V, that is, the first control signal input to the first switch unit 230 has the rising edge, the first control unit 210 may rewake the second control unit 220. That is, in a case in which it is detected that the switch S1 of the charging flap button 16 is in an on-state, and the switch S2 of the charging stop button 18 is in an off-state, the first control unit 210 may enable the power supply unit 260 to operate the second control unit 220 in a wake-up mode.

To this end, the first control unit 210 may enable a 5V LDO for the second control unit 220 to wake up the second control unit 220.

When the second control unit 220 is woken up, the second control unit 220 may disable the first switch unit 230 and enable the second switch unit 240. To this end, the second control unit 220 may disable the first switch unit 230 using the GPIO3 port and enable the second switch unit 240 using the GPIO2 port.

Accordingly, the second control signal is applied from the charging stop button 18 through the second switch unit 240, and the second control unit 220 monitors the second control signal using the ADC port. In a case in which the second control signal is a control signal which instructs to finish charging, that is, the charging stop button 18 is pressed, the second control unit 220 may transmit a signal for turning on the main power supply of the EV 10 to the outside, and wake up the ECU 12 to perform remaining processes to finish the charging.

Meanwhile, in a case in which the charging is finished normally, that is, the user presses the charging flap button 16 again to open the switch S1 of the charging flap button 16 after the charging is finished, the charging flap button 16 is disconnected from the charging stop button 18. Since the switch S2 of the charging stop button 18 is still in the closed state, a predetermined voltage, for example, 5 V may be input to the first switch unit 230. Even if the first control unit 210 recognizes a rising edge which rises from 0 V to 5 V, since the charging is finished normally, an additional process in which the first control unit 210 wakes up the second control unit 220 is not performed.

Meanwhile, in FIG. 7, the example in which the switch S2 of the charging stop button 18 is connected to the switch S1 of the charging flap button 16 and a DC-Box in series and connected to a resistor R having a predetermined value in parallel has been shown, but the present invention is not limited thereto, and a structure of the switch and resistor of the charging stop button 18 may be variously changed.

FIG. 8 is a view illustrating a structure of a charging stop button according to another embodiment of the present invention.

Referring to FIG. 8, a charging stop button 18 may include a first resistor R1 and a second resistor R2, and a switch S3 may be set to be connected to the first resistor R1 or the second resistor R2.

Here, the first resistor R1 may be a resistor for detecting that a charging flap button 16 is pressed, and the second resistor R2 may be a resistor for detecting that the charging stop button 18 is pressed. To this end, the first resistor R1 may have a resistance value lower than that of the second resistor R2. For example, the first resistor R1 may have a resistance value of about several to several hundred ohms, and the second resistor R2 may have a resistance value of several to several hundred kilo-ohms.

Accordingly, the switch S3 of the charging stop button 18 may be connected to the first resistor R1 in a state in which the charging stop button 18 is not pressed, and connected to the second resistor R2 in a state in which the charging stop button 18 is pressed.

When the resistance values of the first resistor R1 and the second resistor R2 included in the charging stop button 18 are adjusted, values of voltages applied to the first switch unit 230 and the second switch unit 240 may be variously changed.

While the present invention has been described with reference to exemplary embodiments thereof, it will be understood by those skilled in the art that various changes may be made therein without departing from the spirit and scope of the invention as defined by the appended claims

REFERENCE NUMERALS

10: ELECTRIC VEHICLE
20: ELECTRIC VEHICLE SUPPLY EQUIPMENT
22: CHARGING CABLE
100: CHARGING CONTROLLER
200: CHARGING CONTROL DEVICE

The invention claimed is:

1. A charging control device of an electric vehicle, comprising:
a charging flap switch;
a charging stop switch;
a main controller that operates in a sleep mode or a wake-up mode and controls charging of a battery of the electric vehicle;
load switches that detect an on-state or off-state of the charging flap switch and an on-state or off-state of the charging stop switch;
a power supply unit that supplies power to the main controller; and
an auxiliary controller that enables or disables the power supply unit,
wherein, in a case in which the main controller operates in the sleep mode, when the auxiliary controller detects the on-state of the charging flap switch and the on-state of the charging stop switch or detects the on-state of the charging flap switch and the off-state of the charging stop switch, the auxiliary controller enables the power supply unit to supply power to the main controller to switch the main controller from the sleep mode to the wake-up mode.

2. The charging control device of claim 1, wherein, when the main controller detects the on-state of the charging flap switch and the off-state of the charging stop switch, the main controller transmits a signal for turning on a main power supply of the electric vehicle to the outside.

3. The charging control device of claim 1, wherein the charging flap switch is connected to a charging flap and a motor that opens or closes the charging flap.

4. The charging control device of claim 3, wherein, when the main controller detects the on-state of the charging flap switch, the main controller generates a control signal such that the motor opens the charging flap.

5. The charging control device of claim 1, wherein, in a case in which the main controller is in the wake-up mode, the auxiliary controller maintains an enabled state of the power supply unit.

6. The charging control device of claim 1, wherein the charging stop switch is connected to the charging flap switch and the load switches in series and connected to a resistor having a preset value in parallel.

7. The charging control device of claim 1, wherein the load switches include a first load switch and a second load switch,
wherein the first load switch is disabled when the second load switch is enabled,
the second load switch is disabled when the first load switch is enabled,
the first load switch is connected to the main controller, and
the second load switch is connected to the auxiliary controller.

8. A charging control device for charging an electric vehicle, comprising:
a first switch unit that receives a first control signal from the outside;
a first control unit that receives the first control signal through the first switch unit;
a second switch unit that receives a second control signal from the outside;
a second control unit that receives the second control signal through the second switch unit, wherein the first control unit enables a power supply unit to supply power to the second control unit to switch the second control unit from a sleep mode to a wake-up mode; and
a motor control unit that is controlled by the second control unit and controls driving of a motor for a charging flap,
wherein, when the second control unit is woken up by the first control unit, the second control unit disables the first switch and enables the second switch.

9. The charging control device of claim 8, wherein the first control signal is a control signal for instructing to start charging or a control signal for instructing to finish charging.

10. The charging control device of claim 9, wherein, when the first control signal is the control signal for instructing to start charging, the first control signal has a falling edge that falls from a first voltage value to a second voltage value.

11. The charging control device of claim 10, wherein, when the first control unit recognizes the falling edge, the first control unit wakes up the second control unit in a sleep state.

12. A charging control method of a charging control device for charging an electric vehicle, the charging control method comprising:
receiving, by a first switch unit, a first control signal, which is a control signal for instructing to start charging or a control signal for instructing to finish charging, from an electric vehicle;
detecting, by an auxiliary controller in a wake-up state, the first control signal input through the first switch unit;

enabling, by the auxiliary controller, a power supply unit that supplies power to a main controller to wake up the main controller that is in a sleep state;

disabling, by the main controller, the first switch unit and enabling a second switch unit; and controlling, by the main controller, charging of the electric vehicle when the main controller detects a second control signal input through the second switch unit, wherein the control signal for instructing to start charging is a signal that indicates that an on-state of a charging flap switch and an on-state of a charging stop switch are detected, and the control signal for instructing to finish charging is a signal that indicates that the on-state of the charging flap switch and an off-state of the charging stop switch are detected.

13. The charging control method of claim 12, comprising transmitting, by the main controller, a signal for turning on a main power supply of the electric vehicle to the outside in a case in which the first control signal is the control signal for instructing to finish charging.

14. The charging control method of claim 12, comprising generating, by the main controller, a control signal for causing a motor, which opens or closes a charging flap, to open the charging flap in a case in which the first control signal is the control signal for instructing to start charging.

15. The charging control method of claim 12, wherein, in a case in which the main controller is woken up, the power supply unit maintains an enabled state.

16. The charging control method of claim 12, wherein:
the first switch unit is disabled when the second switch unit is enabled; and
the second switch unit is disabled when the first switch unit is enabled.

17. The charging control method of claim 12, wherein:
the control signal for instructing to start charging is a signal having a falling edge; and
the control signal for instructing to finish charging is a signal having a rising edge.

* * * * *